United States Patent [19]  
Smalligan

[11] 3,778,910  
[45] Dec. 18, 1973

[54] WRITING AID
[76] Inventor: Lenore R. Smalligan, 1845 Orville S.E., Grand Rapids, Mich. 49506
[22] Filed: June 22, 1972
[21] Appl. No.: 265,290

[52] U.S. Cl. .................................................. 35/37
[51] Int. Cl. ......................................... G09b 11/04
[58] Field of Search ................. 35/37, 36, 38, 35 H, 35/71, 22 R; 33/174 B

[56] References Cited  
UNITED STATES PATENTS

| | | | |
|---|---|---|---|
| 2,277,329 | 3/1942 | Kimbrough | 35/37 |
| 3,672,074 | 6/1972 | Huffstetter | 35/35 H |
| 3,673,708 | 7/1972 | Bevans | 35/37 |
| 3,197,892 | 8/1965 | Hancy | 35/37 |
| 3,423,851 | 1/1969 | Olalainty | 35/37 |

Primary Examiner—Wm. H. Grieb  
Attorney—Peter P. Price et al.

[57] ABSTRACT

A writing aid includes a plurality of stencil modules, each including a template board having a guide track in the pattern of a cursive or script letter or number. The modules are positioned over a writing sheet and further include unidirectional motion limiting devices extending into the guide track at locations which permit motion of a writing instrument in only the proper direction.

16 Claims, 11 Drawing Figures

PATENTED DEC 18 1973 3,778,910

WRITING AID

BACKGROUND OF THE INVENTION

The present invention relates to a writing aid for teaching writing skills and particularly to a device for guiding the motion of a writing instrument unidirectionally within a guide track for providing a hard copy of the characters formed by the track pattern.

Not infrequently, children or others suffer from perceptual disabilities which make it difficult for them to properly print manuscript letters or write cursive letters. Frequently, such a disability can be overcome through rehabilitation by using writing aids of the type which guide the subject's hand motion thereby providing visual, tactile and kinetic reinforcement. These aids allow motion of the hand in directions corresponding to the proper character formation while deterring motion in the reverse direction.

Most of the known rehabilitative devices rely solely on the motion guiding characteristics to reinforce the subject without providing significant visual or other reinforcement. U. S. Pat. No. 3,423,851 issued on Jan. 28, 1969 to E. Olalainty is representative of such devices. U. S. Pat. No. 3,197,892 issued on Aug. 3, 1965 to R. E. Hancy provides, in addition, an audible sound which is designed to encourage motion of the writing hand in the proper direction while simultaneously limiting motion in the reverse direction. A common deficiency of these and other writing aids is that the subject does not actually or simultaneously produce a copy of the letter which is being traced. Thus, although receiving momentary reinforcement during the writing or printing process, the subject does not accomplish the printing of a letter or the like which is, of course, the ultimate goal of the rehabilitation process. It is believed that by providing such a copy, the subject feels a sense of real accomplishment and through such reinforcement, the rehabilitation or learning process can be accelerated.

SUMMARY OF THE INVENTION

Unlike known writing aids, the device of the present invention provides a "hard copy" (i.e., a permanent character) to permit the subject to see the results of his or her efforts. This is largely made possible due to the unique construction of the writing aid which includes a unidirectional motion limiting device which allows the writing instrument to extend through a guide track and contact a writing surface such as paper to produce a permanent copy of a character as it is being traced.

In addition to providing additional reinforcement to the subject using the present writing aid, the apparatus embodying the present invention is adapted to provide visual and/or audio instructional information to the subject to aid in the use of the device and the proper formation of letters.

Apparatus embodying the present invention includes a stencil module with a guide track in the pattern of a character and which is adapted to be positioned over a writing surface for forming a hard copy thereon. The module includes a unidirectional motion limiting device extending laterally into a guide track formed in the module to allow the writing instrument to contact the writing surface while simultaneously limiting the motion of the writing instrument to a direction for properly forming the character in the form of a letter or number.

It is an object of the present invention therefore, to provide an improved writing aid.

An additional object of the present invention is to provide a writing aid having a unidirectional motion limiting device which simultaneously permits a copy to be formed.

Another object of the present invention is to employ a writing aid formed of a plurality of stencil modules which can be combined to form words or other arrays of letters.

Another object of the present invention is to provide sensing means associated with the writing aid for activating a tape transport to provide instructional information to the subject using the device.

Still a further object of the present invention is to provide color coded information to guide the subject in the proper use of the writing aid.

Another object of the present invention is to provide preformed writing sheets for use with the writing aid.

These and other objects of the present invention will become apparent upon reading the following specification together with accompanying drawings.

DETAILED DESCRIPTION OF THE PREFERRED EMBODIMENTS

Figure 1:
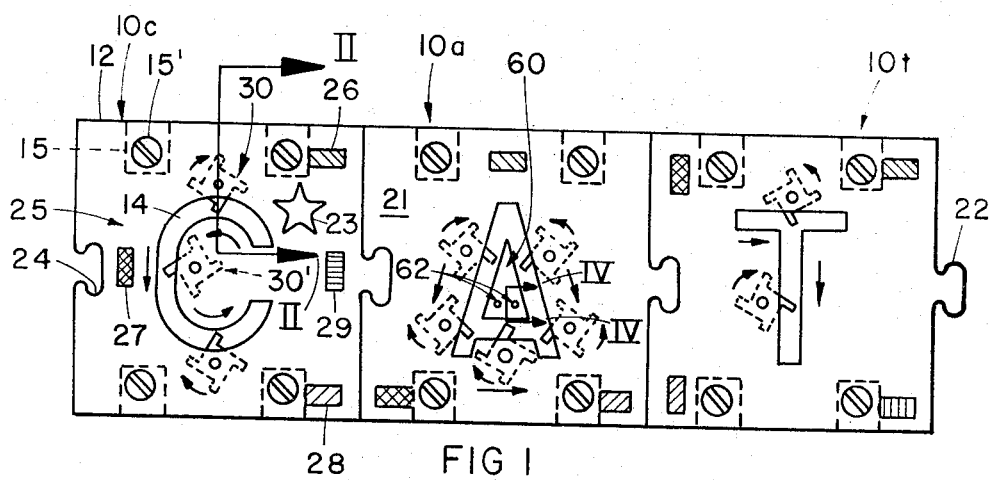
FIG. 1 is a plan view of one embodiment of the present invention.

Referring now to FIG. 1, there are shown three stencil modules 10c, 10a and 10t for the manuscript letters C, A and T respectively. Each of the stencil modules 10 includes a template board 12 having a guide track 14 formed therethrough in the pattern of the desired character. Additionally, each character includes at least one unidirectional motion limiting device 30 which allows a writing instrument such as a pencil 16 (FIG. 2) to follow within the guide tracks 14 only in a direction indicated by the arrows shown in FIG. 1 adjacent the characters. Thus, for the character C, three such unidirectional motion devices 30 are provided, one at the top, middle and near the bottom of the character, while for the character A, five such devices are provided and for the character T, two devices are provided.

The template board 12 is spaced above a base member 18 by spacer means such as blocks 15 attached to the undersurface 13 of the template boards 12 by means of screws 15' or other suitable fastening means. The spacing between members 12 and 18 allows the unidirectional motion devices 30 to be fitted between them while allowing the point of the pencil 16 to project through the guide track and contact a writing surface such as a sheet of paper 20 (FIG. 2) positioned between the template board 12 and the base member 18. The term "guide track" as used herein includes the aperture formed in the template board as well as the space thereunder extending to the writing surface.

The base member 18 may be a table on which the stencil modules are placed or can form an integral portion of the stencil module by hinging each template board to a correspondingly shaped solid base board. The template boards can be made of wood, as shown, in which case the guide tracks for the various characters are milled through the boards.

The template boards likewise can be molded of a suitable thermoplastic material such as P.V.C., polyethylene, etc. In such case, the spacers 15 can be integrally molded therewith. With either construction, the template boards can include keyed tabs and slots 22 and 24 respectively on the edges to interlock adjacent stencil modules as shown in FIG. 1. This provides means for combining characters into words or other desired sequences.

As seen in FIG. 1, each of the characters may include a color coded bar or stripe 25 located on the top surface 21 along the four edges of each of the template boards. Thus, for example, the letter C may include a red stripe 26 on the top edge, a white stripe 27 on the left edge, a blue stripe 28 on the lower edge, and a yellow stripe 29 on the right edge. The remaining letters, likewise, can have the same color stripes located in the same arrangement on the stencil modules or in any other desired arrangement. The stripes can be used together with instructions to aid the user of the writing device in moving the writing instrument from a starting point along the guide track in the desired direction for proper letter formation. Thus, for example, the subject can receive instructions to place the writing instrument at a starting point such as indicated by a star 23 or like key (FIG. 1, stencil 10c) and move the instrument sequentially toward the red, white, blue, yellow and again, red to complete the letter. Such visual aid together with the tactile feedback from the unidirectional motion devices provides reinforcement and instructional functions for aiding the subject in properly forming the letter. It is noted that each character will have its own set of instructions which can be read to the subject by a teacher or, as will be described hereinafter, be reproduced by a tape playback apparatus.

Figure 2:
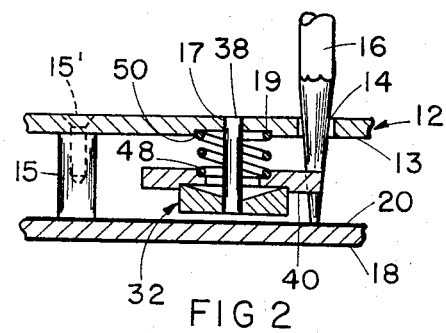
FIG. 2 is an enlarged sectional view of one embodiment of a unidirectional motion device taken along the section lines II—II of FIG. 1.
Figure 3:
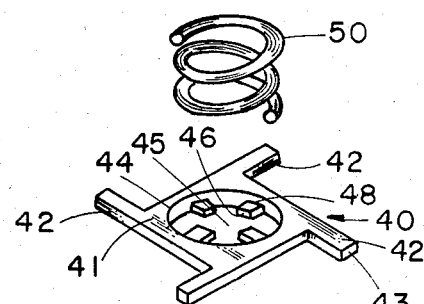
FIG. 3 is an exploded view of the unidirectional motion device shown in FIG. 2.

As seen in FIGS. 2 and 3, the unidirectional motion devices 30 comprise a ratchet wheel 32 having a plurality of beveled surfaces 34 defining upstanding shoulders or notches 36 between adjacent beveled surfaces spaced around the periphery of the ratchet wheel. A shaft 38 extends upwardly from the ratchet wheel and is adapted to be securely fitted within an aperture 17 in the template board adjacent the guide track 14.

Each of the unidirectional motion devices further includes a pin wheel 40 having a plurality of arms 42 extending tangentially from an annular ring 44 thereof. Projecting radially inwardly toward the center of the aperture 45 within the ring 44 is a plurality of tabs 46 which are positioned to contact the beveled surfaces 34 of the ratchet wheel when the member 40 is positioned over the shaft 38. A recessed seat 48 is formed in the top surface 41 of the wheel 40 and is adapted to receive one end of a coil spring 50. Spring 50 is compressively fitted between the wheel 40 and the lower surface 13 of the template board 12 to tend to hold the pin wheel against the ratchet wheel. An annular recess 17 is formed in the lower surface 13 of the template board (FIG. 2) to hold the spring 50 in alignment with respect to the shaft 38 such that the spring in turn holds the pin wheel aperture 45 in central alignment with the ratchet wheel 32.

The aperture 17 in the template board is positioned sufficiently close to the guide track 14 such that the arms 42 of the pin wheel, which can include tapered ends 43 (FIG. 3), will extend laterally into the guide track to contact the writing instrument in the track as it is moved past the arm. By means of the ratchet wheel, the pin wheel motion is limited to a clockwise direction as shown in FIG. 3. Thus, it is seen that the writing instrument can move past a unidirectional motion device 30 in only the direction in which the pin wheel can rotate. If the writing device is moved in the reverse direction, the tabs 46 on the pin wheel will contact the shoulders 36 of the ratchet wheel to prevent rotation of the arm 42 and therefore, motion of the writing instrument.

It is noted here that the ratchet wheel is fixed in relation to the template board and cannot rotate. In some embodiments, the shaft 38 may be glued or otherwise secured within the aperture 17 of the template board and likewise secured to the ratchet wheel to insure that the ratchet wheel does not rotate. The ratchet wheel, as well as the pin wheel, can be molded from a suitable thermoplastic material such as P.V.C., polyethylene or the like. The beveled surfaces on the ratchet wheel can be reversed to allow counterclockwise motion of the pin wheel as shown by the unidirectional motion device 30' used in the character C. This permits the most effective use of the unidirectional motion devices for controlling a writing instrument along the guide track.

Figure 4:
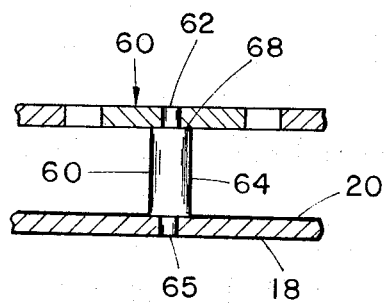
FIG. 4 is a cross-sectional view of a cap portion of the letter A shown in FIG. 1 and is taken along the section lines IV—IV of FIG. 1.
Figure 5:
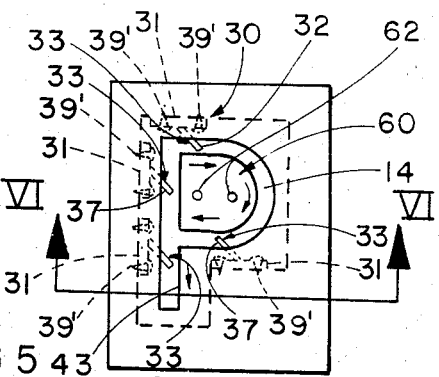
FIG. 5 is a plan view of an alternative embodiment of the present invention.
Figure 6:
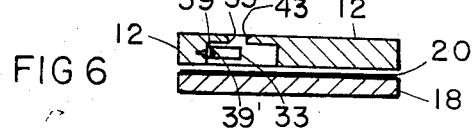
FIG. 6 is a partial cross-sectional view of the embodiment shown in FIG. 5 and taken along the lines VI—VI of FIG. 5.

As seen in FIGS. 1 and 4, certain of the characters, including the manuscript letters A, B, D, O, P, Q, and R have a solid area which will be completely circumscribed by the guide track 14. To accommodate such characters, it is necessary to provide removable caps 60 to fill in the otherwise open space and thereby maintain the continuous guide track. The caps 60 are provided with a pair of apertures 62 for receiving support pins 64 which are fitted within a suitable aperture 65 (FIG. 4) in the base 18 of the device. The support pins 64 can be removably or fixedly mounted to the base and include an enlarged body 66 which defines shoulders 68 that contact the template board and base. The pins therefore serve as stand-off spacers such that caps 60 are positioned in the same plane as the remaining portions of the template board 12 as illustrated in FIG. 4. A tablet 70 of writing paper (FIG. 7) is provided with four apertures 72 which are spaced in upper and lower pairs 74 and 76 respectively to accommodate any combination of the cap pins 64 for all of the characters. Thus, a single tablet provides sheets of paper which can be used with each and every character. For the letter B, for example (shown in FIG. 7), which requires two caps 60, all four apertures 72 are utilized, while for the letter A (FIG. 1), only the top pair 74 of apertures are utilized. An alternative embodiment of the unidirectional motion devices 30 is shown in FIGS. 5 and 6.

Referring now to these figures, it is seen that spring leaf unidirectional motion devices 30 which comprise strips 31 of springable material such as spring steel and having arms 33 extending into the guide tracks 14 are employed. The arms are die stamped from the body of the strips 31 and are integrally formed therewith. For the left side of the letter P shown in FIG. 5, a single strip may include two or more such arms which are positioned against the side wall 39 of a recess 35 formed at the edge of the template board 12 on its underside as shown in FIG. 6. As seen in FIG. 5, the arms are positioned around the periphery of the letter to permit motion of the writing instrument within the guide track 14 in a direction indicated by the arrows adjacent the character. Such an arrangement permits the writing instrument to compress the arms 33 such that they rotate inwardly toward the strips 31 to allow the writing instrument to pass. The arms prevent movement of the writing instrument in the opposite direction since it will catch on the inner side 37 of the arm and move the arm against the opposite edge 43 of track 14 thereby trapping the writing instrument in place. The strips 31 are attached to the wall 39 of the recess by suitable fastening means such as pins 39' which extend through apertures (not shown) in the strips 31 and are imbedded in the template board 12.

As with the previous embodiment, the template boards can be molded of suitable thermoplastic material with pins projecting outwardly therefrom to extend through the apertures 31' in the strips 31. Once the strips have been positioned against the wall 39 and over the pins 39', the pins can be flattened over the strips 31 to hold the strips in place.

Figure 7:
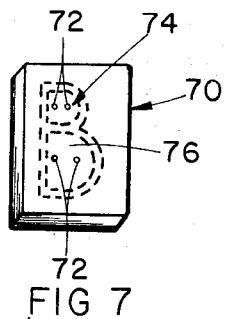
FIG. 7 is a perspective view of a tablet of paper adapted to be used with the writing aid of the present invention.
Figure 8:
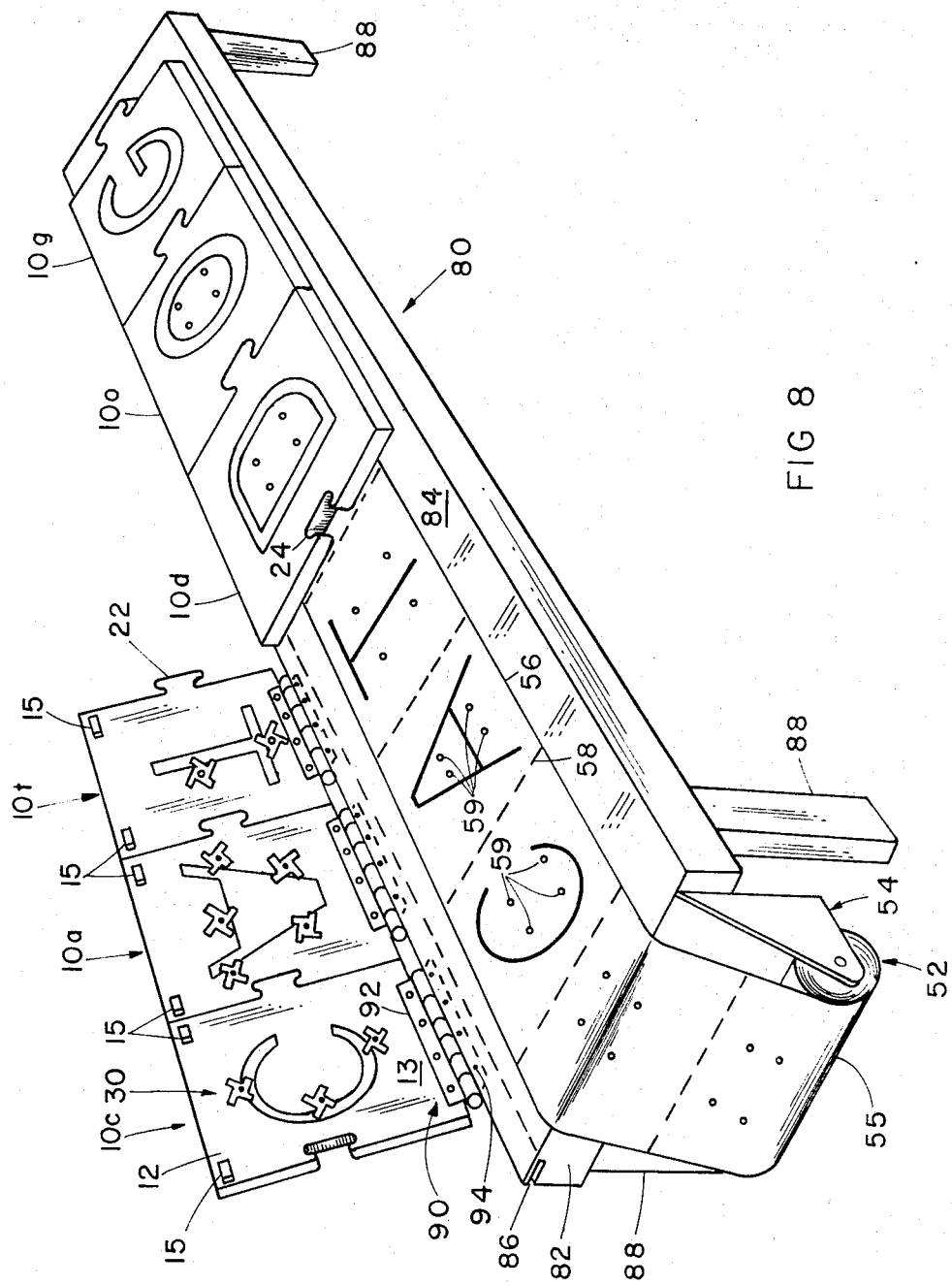
FIG. 8 is a perspective view of a writing aid embodying the present invention employing roll paper feed for supplying writing paper to the device.

In place of the tablet paper 70 shown in FIG. 7, a roll 52 of paper shown in FIG. 8 can be employed together with a table 80 having a top surface 84 upon which the paper is positioned and which includes suitable apertures spaced for receiving removable insert pins 64 (identical to those in FIG. 4) for the caps 60 of letters as necessary. The paper roll 52 includes a suitable holder 54 positioned on one end 82 of the table 80 such that the paper 55 can be unrolled and brought over the surface 84 of the table. The paper comprises individual sheets 56 which are joined to one another by perforations 58 which permit the adjacent sheets to be separated by tearing. Each sheet 56 includes four apertures 59 which permit any one of the sheets to be used with any one of the characters. Thus, pins 64 on the table will extend upwardly through the apertures 59 in the paper sheets 56 when positioned on the surface of the table.

As seen in FIG. 8, each of the template boards 12 includes one or more of the unidirectional motion limiting devices 30. At the top edge of each of the template boards there is positioned a hinge 90 having one leg 92 secured to the underside 13 of the template adjacent the top edge, and an opposite leg 94 snugly fitted within a corresponding slot 86 formed in the rear edge of table 80. Thus, the individual stencil modules 10 can be removably positioned on the table to form a variety of words or other sequences of characters.

In this embodiment, the tabs and slots 22 and 24 respectively are not necessary but can be employed such that the stencil modules 10 can be used with surfaces other than the table 80. For such use, spacers 15, as described above, are provided on the template boards. As the writing aid is used, the template boards are raised by means of the hinges to permit the original paper to be removed and a fresh sheet or sheets of paper to be positioned under the stencil modules. The table 80 includes a plurality of short legs 88 which raises the surface of the table sufficiently above the surface on which the table is positioned to allow clearance for the paper roll 52.

The template modules may, instead of being block manuscript letters, be formed in cursive letters with guide tracks having beveled edges to force the subject to hold the writing instrument at a predetermined correct writing angle as the character is formed. This embodiment is shown in FIGS. 9 and 10 which illustrate the script letter "a" which has a guide track 14 with selectively beveled edges.

Figure 9:
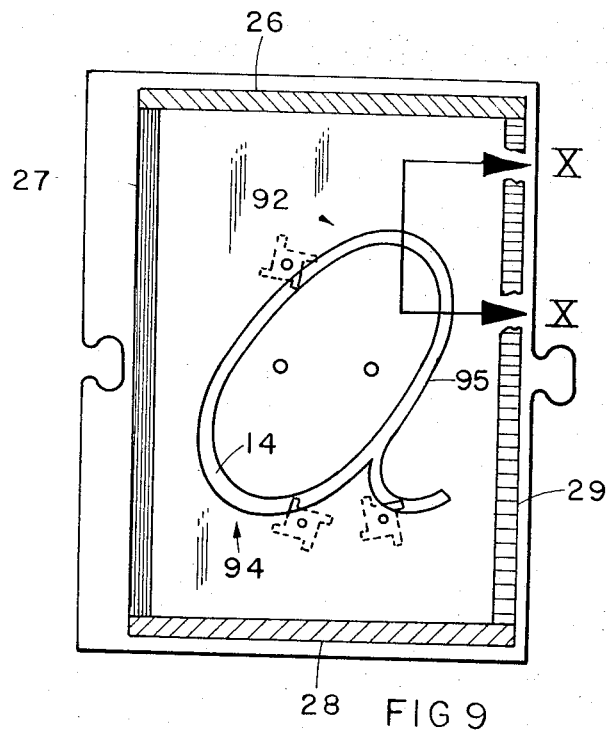
FIG. 9 is a plan view of an embodiment of the present invention for forming cursive writing.
Figure 10:
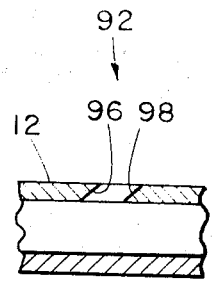
FIG. 10 is a partial cross-sectional view of the character shown in FIG. 9 taken along the section lines IX—IX.

As seen in FIGS. 9 and 10, the generally horizontal and rounded portions of the letter "a" (i.e., within the areas 92 and 94 at the top and bottom) are formed at approximately a 45° angle (FIG. 10) to force the writing instrument into a standard holding position as the subject traces the letter "a" with the writing instrument. The bevel angle is selectively formed in the track such that as the writing instrument traverses the guide track, the holding angle of the writing instrument is constrained to the proper angle. The angular relationship of the side walls 96 and 98 of the guide track 14 will, therefore, vary between being normal to plane of the template board 12 at, for example, 95 where the writing stroke forming the letter "a" is generally vertical, and at approximately a 45° angle at the apices of the letter "a" at areas 92 and 94. The desired skew angle of the guide track (i.e., the bevel) can be ascertained by forming the letters in a moldable material with a stencil and then transferring the information so obtained onto a mold pattern for molding the templates. In the event the template is manufactured from wood, the angle of the milling cutter is set at the desired writing angle as the cutter follows the pattern of the character. The instructional color stripes 25 through 29 shown in FIG. 1 can be extended as shown in FIG. 9 to border the edges of each stencil module.

In addition to, or instead of the color coded instructional bars or stripes shown in FIGS. 1 and 9, the writing aid of the present invention may include means for sensing the positioning of a writing instrument within one of the letters, and suitable control means for actuating a tape playback mechanism which has prerecorded audio or video magnetic or other tapes therein which provide either audio instructions for directing the subject to control a writing instrument in a predetermined manner, or provide other audio/visual instructions. A television monitor and/or audio amplifier and speaker can be employed with the tape transport to provide such information. Such a system is shown in FIG. 11.

Figure 11:
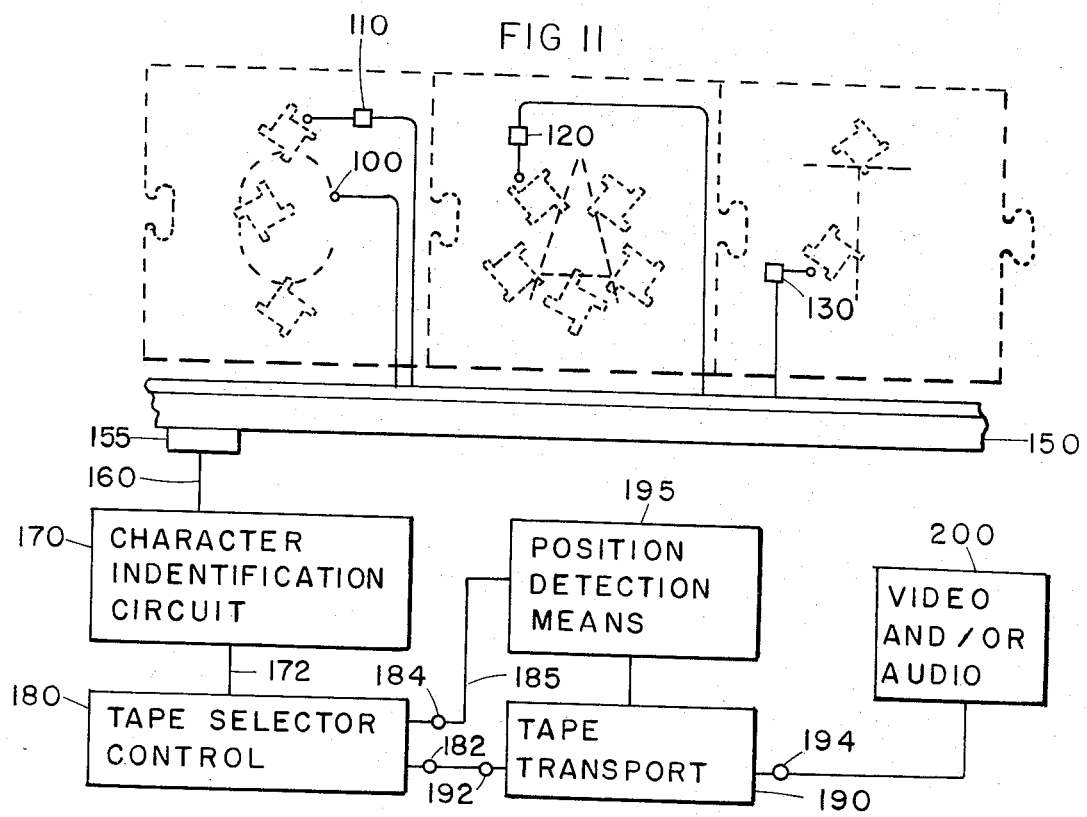
FIG. 11 is an electro-mechanical diagram showing the use of sensors for controlling the playback of a prerecorded instructional tape and the control circuits employed therewith shown in block diagram form.

In FIG. 11, sensors 100, 110, 120 and 130 are positioned on base 18 for the letters C, A, and T. The template boards are shown in phantom form in FIG. 11 to clearly illustrate the positioning of the various sensing or detecting means. For the letter C, for example, a pressure responsive sensor 100 such as a switch can be positioned under the guide track adjacent the start point 23 (indicated by the star in FIG. 1) such that once the writing instrument is positioned at this point, it contacts sensor 100. The actuation of this sensor will, as described hereinafter, control the tape playback transport to play back a prerecorded instructional message for the letter C.

Sensors 110 through 130 are electrical switches positioned to contact an arm of one of the pin wheel type unidirectional motion devices (or the strip type devices) and can be employed in place of pressure responsive sensors. As the writing instrument passes the first unidirectional motion device of the character, it moves to actuate the switch and the instructional recording is actuated to play back the visual and/or audible instructions for the character.

Each character includes a sensor for uniquely identifying it and which is actuated by the writing instrument when positioned or initially moved in the guide track. A pair of conductors extend from each of the sensors to a terminal strip 150 attached to the base 18. The terminal strip includes an electrical jack 155 with a plurality of pins (not shown) to receive the conductors from each of the sensors. A corresponding electrical plug 157 attached to a multiple conductor cable 160 couples the character sensors to a character identification circuit 170.

The identification circuit 170 includes storage circuit means for storing a digital code corresponding to each of the uniquely identifiable characters employed with the writing aid. As a sensor for a particular character senses the presence of a writing instrument, the actuation of the sensor triggers a readout circuit included within the storage means to cause the identification circuit to output a unique character identifying digital signal for each character. This signal appears on conductor 172 which couples circuit 170 to a tape selector control circuit 180.

The tape selector control has an output terminal 182 coupled to the input 192 of a tape transport 190 and an input terminal 184 coupled to a feedback loop 185 from the tape transport. The tape transport 190 has an output terminal 194 which is coupled to a suitable display device 200 which may include a T.V. monitor and/or audio amplifier with a speaker for reproducing audio instructions. The video or audio tape used with the transport includes at preselected locations therealong, recorded instructional information for each of the reference characters. The transport further includes means 195 for detecting the actual position of the tape on the reels of the transport.

The position detecting means 195 may, for example, include a suitable shaft encoder, counter, or other means which are well-known for providing tape position information to the tape selector control 180. The tape selector control includes a memory circuit which is programmed when the tape is made to indicate for each digital signal identifying a character, the corresponding predetermined tape position of the prerecorded information for that character. Thus, for each digital signal from the circuit 170 that is applied to the selector control 180, the memory circuit of the control 180 provides a corresponding tape position signal which can be compared with the actual tape position signal from feedback line 185.

The tape selector control further includes a comparator circuit which compares the actual position signal with the position signal from circuit 170 and provides a command signal at output terminal 182 for actuating the tape transport to operate in a searching mode of operation shifting the tape to the desired location where the prerecorded information is positioned. As the tape transport is actuated, the actual position signals fed back to the tape selector control continuously change until coincidence exists between these signals and the signals from circuit 170. At this time, the tape transport is switched from a searching mode to a playback mode of operation and provides electrical signals representative of the desired prerecorded information which are applied to the reproduction device 200. The recording medium includes a prerecorded pilot signal at the end of each recorded instruction which is selected by suitable detecting means for inactivating the tape transport at the end of the recorded instruction. The various circuits for controlling the tape transport including the memory and storage circuits, the comparator, and the control circuits are well-known in the art and need not be described in detail here. The tape transport can be an endless loop cartridge playing device or other suitable mechanism.

Thus, it is seen that the writing aid of the present invention has several features which provide the subject using the aid with increased reinforcement to speed up the rehabilitative instructional process and positively reinforce the subject when a letter has been properly traced. The apparatus likewise can be used to maintain a proper writing angle for the writing instrument in the hand of the subject using the writing aid, as well as providing audio/visual instructional information, either in the form of color coded stripes or prerecorded information. It will become apparent to those skilled in the art that various modifications to the embodiments shown herein can be made without departing from the spirit or scope of the present invention as defined by the appended claims.

What is claimed is:

1. A stencil module for a writing aid comprising:
  a template board having a guide track formed therethrough in the pattern of a predetermined character and adapted to be positioned over a writing surface such that a writing instrument can be extended through said guide track and contact the writing surface; and
  unidirectional motion limiting means positioned between said template board and the writing surface and including a member extending into said area defining said guide track to contact a writing instrument and limit the motion of said writing instrument within said guide track to one direction as it passes said unidirectional motion limiting means.

2. The apparatus as defined in claim 1 wherein said unidirectional motion limiting means comprises at least one arm extending laterally into said guide track and movable substantially in only one direction.

3. The apparatus as defined in claim 2 wherein said unidirectional motion limiting means comprises:
  a ratchet wheel having a central shaft rigidly attached to said template board adjacent said guide track,
  a pin wheel comprising an annular ring including tabs extending radially inward, said ring being positioned over said central shaft of said ratchet wheel, said pin wheel further including arms extending outwardly therefrom and projecting into said guide track, and bias means for holding said pin wheel in contact with said ratchet wheel.

4. The apparatus as defined in claim 3 wherein said ratchet wheel includes a plurality of alternate beveled surfaces and shoulders to permit the tabs of said pin wheel to move on said surfaces in one direction only.

5. The apparatus as defined in claim 4 and further including a plurality of spacers positioned between said template board and the surface upon which said board is positioned.

6. The apparatus as defined in claim 1 wherein said unidirectional motion limiting means comprises a strip of springable material having at least one arm integrally formed therewith and extending outwardly therefrom, said strip being positioned on said template board adjacent said guide track such that said arm extends laterally into said guide track and can move inwardly toward the strip when contacted by a writing instrument moving by said arm in one direction to permit a writing instrument to pass thereby, but restricts motion of said writing instrument in an opposite direction.

7. A writing aid for selectively guiding a writing instrument to provide copies of characters comprising:
a template board with a guide track formed therethrough in the pattern of a character and circumscribing a central portion of at least one character pattern;
base means supporting said template;
at least one support member extending from said base and positioned thereon to be within the central portion of said character when said template board is positioned on said base; and
cap means removably positioned on said support means for completing a continuous guide track forming said at least one character.

8. The apparatus as defined in claim 7 and further including a sheet of writing material including at least one aperture therein for receiving said support member when said writing material is positioned on said base member for providing a hard copy of said character as said writing instrument travels along said guide track.

9. The apparatus as defined in claim 8 and further including unidirectional motion limiting means positioned between said base means and said template board and including an arm extending into said guide track to limit the movement of a writing instrument in said guide track to a single direction as said instrument passes said unidirectional motion limiting means.

10. A writing aid comprising:
a base member adapted to receive thereon a sheet of writing material;
a template board positioned over said base member in spaced relationship thereto and including a guide track extending through said template board in a predetermined pattern; and
at least one unidirectional motion device positioned on said template board and including an arm extending into the path of a writing instrument following said guide track and in contact with a writing surface positioned on said base member to contact said writing instrument and permit motion of the writing instrument past said unidirectional motion limiting device in only one direction.

11. The apparatus as defined in claim 10 wherein said template board includes color coded areas on a top surface thereof for providing directional motion information to a subject using the writing aid.

12. The apparatus as defined in claim 10 and further including a sensor for detecting the presence of a writing instrument in said guide track and for providing a signal representative thereof;
a playback mechanism including prerecorded instructional information therewith;
means coupled to said playback mechanism for reproducing said instructional information therefrom when said playback mechanism is actuated; and
control means coupled to said sensor and to said playback mechanism to actuate said playback mechanism when said sensor detects the presence of a writing instrument.

13. The apparatus as defined in claim 12 including a plurality of template boards each with a unique character forming guide track, a plurality of sensors each associated with one of said characters, a plurality of unique instructions recorded at preselected locations on a recording medium associated with said play back mechanism and corresponsing to ones of said characters, and means coupled to said sensors and to said playback mechanism for selectively actuating said playback mechanism for reproducing an instruction for a corresponding character as a sensor for that character is actuated by a writing instrument.

14. The apparatus as defined in claim 13 wherein said recording medium is magnetic tape and said playback mechanism includes tape transport.

15. A writing aid for aiding a subject in forming a hard copy of predetermined characters by following predetermined characters from a guide track formed in a board with a writing instrument, said writing aid comprising:
a template board positionable over a sheet of writing material and including a guide track formed therethrough for tracing a predetermined character on said writing material; and
an arm positioned to extend laterally into said guide track and movable in at least one direction with relative ease while being resistive to motion in an opposite direction thereby allowing a writing instrument in said guide track to pass said arm in only said one direction.

16. The apparatus as defined in claim 15 wherein said guide track includes a pair of side walls which are selectively beveled to maintain the writing instrument positioned in said guide track at a predetermined writing angle with respect to the hand of the subject using said writing aid.

* * * * *